United States Patent Office 3,654,151
Patented Apr. 4, 1972

---

3,654,151
DEFLOCCULATION OF SOLID MATERIALS IN AQUEOUS MEDIUM
Thomas M. King, St. Louis, and Howard L. Vandersall, Ballwin, Mo., assignors to Monsanto Company, St. Louis, Mo.
No Drawing. Filed Apr. 13, 1970, Ser. No. 27,981
Int. Cl. B01j 13/00; C04b 33/12; C10m 3/38
U.S. Cl. 252—8.5 C                    4 Claims

ABSTRACT OF THE DISCLOSURE

Ethane diphosphonates having the formula

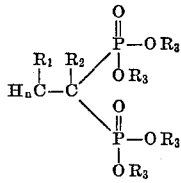

wherein $R_1$ and $R_2$ are hereinafter defined and $R_3$ is hydrogen or a metal ion and $n$ is an integer having a value of 1 or 2, are disclosed as deflocculating agents in aqueous vehicles or systems containing finely divided solid materials such as oil well drilling muds.

---

This invention relates to aqueous dispersions of finely divided solid materials in a deflocculated condition and methods for their preparation. More particularly this invention relates to the use of certain ethane diphosphonates as deflocculating agents for finely divided solid materials in an aqueous slurry.

Many industrial processes today use aqueous suspensions or slurries in which the water is used as the vehicle for transporting the solids. The phenomenon of deflocculation, that is, the separation of aggregates into smaller units, plays an important role in the use of slurry systems by altering the flow or rheological properties of the system. There are in use today many and various kinds of deflocculating agents, one class of which, the condensed phosphates, have gained widespread use in such slurry systems as oil well drilling muds, kaolin processing, wet processing of cement, water-base paint pigment suspensions and the like. However, their susceptibility to hydrolysis in aqueous slurry systems is well known, being primarily dependent on the temperature and pH conditions of the system. This limitation sometimes severely restricts their use. As can be appreciated, therefore, a "hydrolytically stable" deflocculating agent would represent an extremely important advancement in this art.

Therefore, it is an object of this invention to provide improved aqueous dispersions of finely divided solid materials in a deflocculated condition.

It is another object of this invention to provide a process for dispersing in a deflocculated condition finely divided solid materials in an aqueous medium by use of a deflocculating agent.

A further object of this invention is to provide a "hydrolytically stable" deflocculating agent for use in dispersing in a deflocculated condition finely divided solid materials in an aqueous medium.

A further object of this invention is to provide an improved deflocculating agent for use in such slurry systems as oil well drilling muds, kaolin processing, wet processing of cement, water-base paint pigment suspensions and the like.

Other objects will become apparent from the detailed description and the claims.

It has now been discovered that aqueous dispersions of finely divided solid materials in a deflocculated condition can be prepared by incorporating therein a minor amount of one or more substituted ethane diphosphonic acids and their salts which collectively have the following generic formula:

(I)

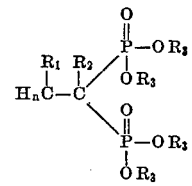

In the above Formula I, $R_1$ can be from the group oxygen; halogen; hydroxy; —CN; —N($R_4$)$_2$, where $R_4$ is from the group hydrogen and alkyl containing from 1 to 30 carbon atoms, preferably from 1 to 8 carbon atoms and more preferably from 1 to 4 carbon atoms; —$XR_5$, where X is from the group oxygen and sulfur and $R_5$ is from the group alkyl containing from 1 to 30 carbon atoms, preferably 1 to 8 carbon atoms, more preferably 1 to 4 carbon atoms; $C_6H_5$ (phenyl) and $CH_2 \cdot C_6H_5$ (benzyl); acetoxy; —$SO_3R_4$ where $R_4$ is the same as defined above; benzoyl; —$CO_2H$; and —$CH(COOR_6)_2$, where $R_6$ is an alkyl group containing from 1 to 30 carbon atoms, preferably from 1 to 8 carbon atoms, and more preferably from 1 to 4 carbon atoms.

In the aforegoing general Formula I, $R_2$ is from the group $R_1$, except oxygen, and hydrogen. It is to be understood that $R_2$ then is never oxygen and $R_2$ is only hydrogen when $R_1$ is oxygen. Additionally, it is to be understood that in all cases, except when $R_1$ is oxygen and $R_2$ is hydrogen, at least $R_1$ or $R_2$ is a hydroxy group. In other words and for exemplary purposes only, when $R_1$ is chlorine, $R_2$ must be a hydroxy group.

In conjunction with the proviso that $R_2$ is only hydrogen when $R_1$ is oxygen with reference to the aforegoing general Formula I, $n$ is an integer having a value of 1 or 2 and $n$ is only 1 when $R_1$ is oxygen.

In Formula I, $R_3$ is from the group metal ions and hydrogen. The aforementioned metal ions are cations which are capable of forming a water-soluble salt and are from the group of metals which includes without limitation alkali metals such as sodium, lithium and potassium; ammonium ions; and alkyl ammonium ions. In particular, those alkyl ammonium ions derived from amines having a low molecular weight, such as below about 300, and more particularly the alkyl amines, alkylene amines, and alkanol amines containing not more than two amine groups, such as ethyl amine, diethyl amine, propyl amine, propylene diamine, hexyl amine, 2-ethylhexylamine, N-butylethanol amine, triethanol amine, and the like, are the preferred amines.

It is to be understood that all of the compounds falling within the above Formula I and as heretofore defined are generically described herein as "ethane diphosphonates." In other words then, the acids, salts and mixtures thereof are all generically described herein as ethane diphosphonates.

In general, the ethane diphosphonates are prepared by contacting an epoxy ethane diphosphonate having the following formula:

(II)

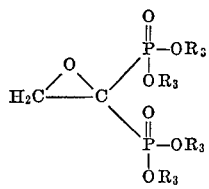

wherein $R_3$ is the same as defined above, with a de-oxiranization agent which opens the ring of said epoxy compound (and provides the substituents on the carbon atoms) to form the ethane diphosphonates falling within Formula I. It is to be understood that the term "epoxy ethane diphosphonate" used herein generically describes and encompasses the acid and salt forms, and said term is designated at times herein EEDP for the sake of brevity.

The de-oxiranization agents which effect this "ring opening" are from the group water, ammonia, primary amines, secondary amines, acids, malonates, alcohols, mercaptans, Lewis acid catalysts and mixtures thereof. The specific application of these de-oxiranization agents are disclosed in the processes which are described hereinafter.

In conjunction with the water "agent," this "ring opening" of EEDP is effected by hydrolysis at a temperature of from about 50° C. to about 150° C. with or without an inert diluent and acid catalyst, e.g. (respectively), dioxane and HCl.

As illustrative of the ethane diphosphonates which can be prepared according to the aforementioned hydrolysis reaction of EEDP, there may be mentioned without limitation, the following compounds:

(1) $H_2C(OH)C(OH)(PO_3H_2)_2$
 1,2 dihydroxy ethane-1,1-diphosphonic acid
(2) $H_2C(OH)C(OH)(PO_3NaH)_2$
 disodium 1,2 dihydroxy ethane-1,1-diphosphonate
(3) $H_2C(OH)C(OH)(PO_3K_2)_2$
 tetrapotassium 1,2 dihydroxy ehtane-1,1-diphosphonate
(4) $H_2C(OH)C(OH)(PO_3NH_4)_2$
 diammonium 1,2 dihydroxy ethane-1,1-diphosphonate The deoxiranization agents ammonia, primary amines and secondary amines are generically equated $(R_4)_2NH$ and $R_4$ has the same connotation hereinbefore ascribed. This "ammonolysis" reaction of $(R_4)_2NH$ with EEDP is generally conducted at a temperature between about −40° C. and about 150° C. under atmospheric conditions.

As illustrative of the ethane diphosphonates which can be prepared according to the aforementioned ammonolysis of EEDP, there may be mentioned, without limitation, the following compounds:

(5) $H_2C(NH_2)C(OH)(PO_3H_2)_2$
 2-amino-1-hydroxyethane-1,1-diphosphonic acid
(6) $H_2C(OH)C(NH_2)(PO_3H_2)_2$
 2-hydroxy-1-aminoethane-1,1-diphosphonic acid
(7) $H_2C(NH_2)C(OH)(PO_3Na_2)_2$
 tetrasodium 2-amino-1-hydroxyethane-1,1-diphosphonate
(8) $H_2C(NHCH_3)C(OH)(PO_3H_2)_2$
 2-methylamino-1-hydroxyethane-1,1-diphosphonic acid
(9) $H_2C[N(C_2H_5)_2]C(OH)(PO_3H_2)_2$
 2-diethylamino-1-hydroxyethane-1,1-diphosphonic acid
(10) $H_2C[N(C_4H_9)_2]C(OH)(PO_3Na_2)_2$
 disodium 2-dibutylamino-1-hydroxyethane-1,1-diphosphonate The "acid" de-oxiranization agents, designated herein as HZ, relate to certain inorganic and organic acids which effect the ring opening. Specifically, the cation Z is from the group halogen (such as chlorine, bromine, fluorine and the like), —CN, acetoxy ($CH_3COO$—), sulfonate ($SO_3R_4$ wherein $R_4$ has the same connotation as heretofore set forth and is from the group hydrogen and alkyl), benzoyl ($C_6H_5CO$—), and carboxy (HOOC—). This acid reaction is generally conducted at a temperature between about −10° C. and 150° C. under atmospheric conditions.

As illustrative of the ethane diphosphonates which can be prepared according to the aforementioned acid reaction with EEDP, there may be mentioned, without limitation, the following compounds:

(11) $H_2C(Cl)C(OH)(PO_3H_2)_2$
 2-chloro-1-hydroxyethane-1,1-diphosphonic acid
(12) $H_2C(OH)C(Cl)(PO_3H_2)_2$
 2-hydroxy-1-chloroethane-1,1-diphosphonic acid
(13) $H_2C(CN)C(OH)(PO_3KH)_2$
 dipotassium 2-cyano-1-hydroxyethane-1,1-diphosphonate
(14) $H_2C(SO_3H)C(OH)(PO_3H_2)_2$
 2-sulfo-1-hydroxyethane-1,1-diphosphonic acid
(15) $H_2C(F)C(OH)(PO_3HNa)_2$
 disodium 2-fluoro-1-hydroxyethane-1,1-diphosphonate
(16) $H_2C(SO_3C_2H_5)C(OH)(PO_3H_2)_2$
 2-ethylsulfo-1-hydroxyethane-1,1-diphosphonic acid The malonate de-oxiranization agent referred to herein as $MHC(COOR_6)_2$, wherein $R_6$ is the same as hereinbefore ascribed and M is an alkali metal such as sodium, can be reacted with EEDP at a temperature between about 5 and about 240° C. under atmosphere conditions to form said ethane diphosphonates.

As illustrative of the ethane diphosphonates which can be prepared according to the aforementioned malonate reaction with EEDP, there may be mentioned, without limitation, the following compounds:

(17) $HC(COOC_2H_5)_2CH_2C(OH)(PO_3H_2)_2$
 diethyl (2-hydroxy-2,2-diphosphonoethyl) malonate
(18) $H_2C(OH)C(PO_3H_2)_2CH(COOC_2H_5)_2$
 diethyl (2-hydroxy-1,1-diphosphonoethyl)malonate
(19) $HC(COOC_4H_9)_2CH_2C(OH)(PO_3H_2)_2$
 dibutyl (2-hydroxy-2,2-diphosphonoethyl) malonate
(20) $H_2C(OH)C(PO_3Na_2)_2CH(COOCH_3)_2$
 dimethyl (tetrasodium 2-hydroxy-2,2-diphosphonoethyl) malonate
(21) $H_2C(COOCH_3)_2CH_2C(OH)(PO_3H_2)_2$
 dimethyl (2-hydroxy-2,2-diphosphonoethyl) malonic acid The alcohol and mercaptan de-oxiranization agents, generically referred to herein as $R_5XH$, wherein $R_5$ is the same as hereinbefore ascribed and X is oxygen or sulfur, can be reacted with EEDP at a temperature between 5° C. and 180° C. under atmospheric conditions to form said ethane diphosphonates. The alcohols utilized are the monoatomic aliphatic alcohols containing from 1 to 30 carbon atoms, preferably from 1 to 8 carbon atoms, including the respective isomers thereof. Typical alcohols include, for example, methanol, ethanol, propanol and n-butyl alcohol. It is also within the scope of these processes to utilize alcohols such as phenol and benzyl alcohol. The mercaptans utilized are the aliphatic mercaptans containing from 1 to about 30 carbon atoms, preferably from 1 to 8 carbon atoms, and include, for exemplary purposes only, methyl mercaptan, ethyl mercaptan, propyl mercaptan and n-butyl mercaptan. The isomers of the various mercaptans are also included herein.

As illustrative of the ethane diphosphonates which can be prepared according to the aforementioned reaction of EEDP with either alcohols or mercaptans, there may be mentioned, without limitation, the following compounds:

(22) $H_2C(OCH_3)C(OH)(PO_3H_2)_2$
   2-metohxy-1-hydroxy ethane-1,1-diphosphonic acid
(23) $H_2C(OH)C(OCH_3)(PO_3H_2)_2$
   2-hydroxy-1-methoxy ethane-1,1-diphosphonic acid
(24) $H_2C(OC_2H_5)C(OH)(PO_3NaH)_2$
   disodium 2-ethoxy-1-hydroxy ethane-1,1-diphosphonate
(25) $H_2C(SCH_3)C(OH)(PO_3H_2)_2$
   2 - thiomethyl-1-hydroxy ethane - 1,1 - diphosphonic acid
(26) $H_2C(OC_6H_5)C(OH)(PO_3H_2)_2$
   2-phenoxy-1-hydroxy ethane-1,1-diphosphonic acid
(27) $H_2C(SC_6H_5)C(OH)(PO_3H_2)_2$
   2-thiophenyl, 1-hydroxy ethane - 1,1 - diphosphonic acid The reaction of EEDP in the presence of a metal halide Lewis acid yields the "oxy" derivative according to the following equation:

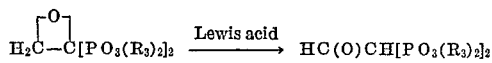

In conjunction with the above reaction, a wide variety of Lewis acids can be utilized in order to effect an acid catalyzed rearrangement of the epoxy ethane diphosphonate. There may be mentioned for exemplary purposes only and without any limitation metal halide Lewis acids such as boron trifluoride, zinc chloride, magnesium bromide, ferric chloride, stannic chloride, titanium chloride, zirconisum chloride, aluminum chloride and the like. In conjunction with the utilization of the Lewis acid for the acid catalyzed rearrangement, it is preferred to first dissolve or suspend the metal halide in a non-aqueous inert aprotic solvent such as nitromethane, dichloromethane, nitrobenzene, nitropropane, chlorobenzene, dichlorobenzene, dichloroethane, tetrachloroethane, perchloroethylene, petroleum ether, carbon tetrachloride, chloroform, carbon disulfide, ethyl ether, benzene and the like, and then contact the resultant solution or slurry with the EEDP material. The amount of solvent utilized is not a limiting factor as long as that amount chosen does not substantially adversely affect the preparation of the desired end product.

The acid catalyzed rearrangement of the epoxy ethane diphosphonate is generally conducted with the epoxy ethane diphosphonate and a Lewis acid catalyst (and, if desired, an inert aprotic solvent such as ethyl ether) at a temperature between about −20° C. and 150° C., and under atmospheric conditions. Higher or lower temperatures can be utilized, e.g., as low as −50° C. and as high as 250° C., depending, for example, upon the boiling point of said solvent. It is within the scope of the present invention that super-atmospheric (e.g., from about 1 to 10 atmospheres) and sub-atmospheric (e.g. 1/2 to 760 mm. Hg) conditions and also in an inert atmosphere such as nitrogen or helium may be utilized where one so desires.

The quantity of Lewis acid catalyst utilized in conjunction with the acid catalyzed rearrangement will vary somewhat, depending upon the type of metal halide Lewis acid catalyst utilized, the temperature at which the reaction takes place, and in some instances, the pressure of the system. It is to be understood that any amount of Lewis acid catalyst can be utilized as long as that amount is not substantially detrimental to achieving the desired end product. It is found that from about 0.01 to about 4 mole equivalents of said catalyst for each mole of EEDP starting material suffices to form the aforesaid "oxy" derivatives in satisfactory yields.

As illustrative of the ethane diphosphonates which can be prepared according to the aforementioned acid catalyzed rearrangement of EEDP, there may be mentioned, without limitation, the following compounds:

(28) $HC(O)C(H)(PO_3H_2)_2$
   2-oxy ethane-1,1-diphosphonic acid
(29) $HC(O)C(H)(PO_3NaH)_2$
   disodium 2-oxy ethane-1,1-diphosphonate
(30) $HC(O)C(H)(PO_3K_2)_2$
   tetrapotassium 2-oxy ethane-1,1-diphosphonate The aforementioned epoxy ethane diphosphonates (EEDP) which are the basic starting materials in conjunction with the preparation of ethane diphosphonates falling within Formula I can be prepared, for example, by reacting the disodium salt of ethylene diphosphonic acid, i.e.,

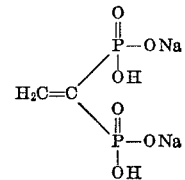

with hydrogen peroxide (which functions as an epoxidizing agent) in the presence of a catalyst such as sodium tungstate. The above ethylene diphosphonate, also sometimes referred to in the art as vinylidene diphosphonate, is known in the art (in its ester form and processes for preparing the same) as exemplified by U.S. 3,062,792, which is incorporated herein by reference. The ethylene diphosphonic acids and salts per se and processes for preparing the same are described in Canadian Pat. No. 811,-736, which is incorporated herein by reference.

By the term "hydrolytically stable" as used herein is meant a substantial resistance by the deflocculating agent to hydrolysis or degradation under various pH and temperature conditions. For example, a 20 gram sample of tetrasodium 1,2 dihydroxy ethane-1,1-diphosphonate, $$H_2C(OH)C(OH)(PO_3Na_2)_2$$

was dissolved in 100 ml. of water. A 25 ml. portion of the solution was added to a 25 ml. portion of 12 M HCl to give a 10% solution of the agent in HCl. Another 25 ml. portion of the solution was added to a 25 ml. portion of 10% NaOH to give a 10% solution of the agent in a 5% solution of NaOH. The foregoing 10% solutions were boiled for a period of four hours, at the end of which both solutions exhibited no change in physical properties. Nuclear magnetic resonance spectra showed the two 10% solutions to be identical with unheated fresh 10% solutions of the agent in similar acid and alkaline solutions, thus establishing the resistance of the agent to hydrolysis or degradation under severe temperature and pH conditions. It should be noted that all known polyphosphates, whether in the acid, salt or ester form, would hydrolyze or degrade completely under the foregoing conditions. Another sample, in this instance 2 grams of the anhydrous tetra sodium 1,2 dihydroxy ethane-1,1-diphosphonate powder, was heated on a thermogravimetric balance. Below a temperature of 300° C. less than 1% weight loss resulted. X-ray diffraction patterns of the heated sample and an unheated sample were identical. As is believed apparent from the foregoing, the deflocculating agents of the instant invention are hydrolytically stable and by exhibiting deflocculating properties comparable to the polyphosphates can be used advantageously in many various aqueous slurry applications.

Generally stated, this invention relates to the use of ethane diphosphonates as improved deflocculating agents for aqueous dispersions of finely divided solid materials, and, in addition, this invention also relates to the aqueous slurry compositions resulting therefrom and containing the improved deflocculating agent. It is to be understood that all water soluble salts of these ethane diphosphonates are generally suitable for use. While the water soluble alkali metal salts, such as the sodium, potassium and lithium salts are preferred, it is also within the scope of the present invention to use the alkaline earth salts, such as the calcium and magnesium salts and zinc salts.

The deflocculating agents of the present invention can be advantageously used for deflocculation purposes with many and various finely divided solid materials which are capable of being dispersed in an aqueous vehicle. Illustrative of such finely divided materials are organic solid materials such as coal including lignite (brown coal), bituminous (soft coal), anthracite (hard coal), charcoal and the like and inorganic solid materials such as various clays, fuller's earth, bauxite, phosphate containing ores, argillaceous materials, calcareous materials, pigments which include ferric oxide, iron blues, red lead, white lead (basic carbonate), white lead (basic sulfate), lead chromate, zinc oxide, zinc chromate, zinc sulfide, lithopone, chromium oxide, titanium dioxide (Anatase), titanium dioxide (Rutile), antimony oxide, cadmium sulfide, lead titanate, extended pigments which include titanium-barium, titanium-calcium, zinc sulfide-magnesium or any combinations of pigments used to provide pigments of other than the primary colors which include lead chromate-lead oxide, iron blue and lead chromate, and the like. As being illustrative of the foregoing solid materials in slurry systems are off well drilling muds, kaolin processing, wet processing of cement, water-base paint pigment suspensions, coal processing and the like. The foregoing solid materials and specific areas of utilizations are by no means the extent of their use, and therefore, the invention is not intended to be limited thereto.

The amounts of the deflocculating agent necessary to deflocculate the slurry system in any specific instance depends, inter alia, on the viscosity desired, conditions of use, contaminants and the like, but in any event only minor amounts are usually sufficient, i.e., as little as 0.01% by weight of solids can give improved results and usually about 1% by weight of solids suffices in most applications; however, larger amounts can be used if one so desires. Because it is believed that the ability of the deflocculating agent to deflocculate is enhanced by an increase in the number of phosphonic acid groups which ionize, it is preferred that the slurry system be at a pH of 5 or above.

The deflocculating agents of the present invention may be added to the slurry system as an aqueous solution or as a solid in powdered form or it may be incorporated as a dry solid with the substantially dry solid materials prior to being added to the aqueous vehicle. Alternatively, the dispersion and mixing may take place simultaneously by intimately mixing the solid materials with water and the deflocculating agent.

As previously mentioned the deflocculating agent is especially suited for use in kaolin clay slurries. In kaolin processing it is common to find kaolin slurries used in transporting kaolin from the mine to the plant and the processing in the plant may also be performed on the slurries. Customarily the processing is done on a deflocculated-flocculated-redeflocculated slurry system with the redeflocculation or final deflocculation accomplished prior to spray drying or drum drying. In addition, kaolin is sometimes shipped to users in the slurry form. As can be appreciated contaminants in the kaolin, effects of flocculating additives and other agents used in the process, and the variations in temperature encountered are some of the severe conditions placed on the functioning of the deflocculating agent. It is therefore believed appreciated that a deflocculating agent which is relatively hydrolytically stable would be a distinct advantage in kaolin slurry processing.

The amount necessary for the deflocculating agent to deflocculate the kaoline slurry is dependent on many factors, the most important of which is the viscosity desired, however, in any case only a minor amount in the order of about .01 to 1% by weight of solids is usually sufficient.

The ethane diphosphonate deflocculating agents are especially suited for use in drilling muds. High temperatures at substantial depths which sometimes reach 250° C., contamination by salt brines or as a result of cementing operations are among the factors which cause undesirable variations in viscosity properties of the muds. The ability of the drilling muds to maintain a suitable viscosity over a wide range of temperatures and pH conditions is, therefore, a distinct and important requirement. It can be appreciated that since the present invention deflocculating agents, which are hydrolytically stable over a wide range of temperature and pH conditions, are well suited for use in drilling muds.

The drilling muds may be comprised of any conventional type material such as hydratable clay or colloidal clay bodies which are capable of being deflocculated or dispersed in an aqueous vehicle. Such clay materials as Wyoming bentonite, commercial medium-yield drilling clays mixed in various parts of the country such as Texas, Tennessee, and Louisiana are among those which are frequently encountered. Weighting material added to increase specific gravity such as barytes, iron oxide, calcium carbonate, silica and the like may also be included. The aqueous vehicle may be any type of suitable fresh or salt water such as is obtained from wells, lakes or the sea. In addition, the drilling muds of the invention may contain other additives, such as caustic, soda ash, quebracho, lime, cement, gypsum and the like.

The quantities of the ethane diphosphonates to be added will vary with, among other things, the properties desired and the type of clay used. Under normal conditions quantities of the deflocculating agent within the range of about .01 to 1% by weight of solids are usually usable. It is to be understood that higher amounts (e.g. up to 5% by weight) can be used if one so desires.

The ethane diphosphonates can be added directly to the drilling fluid is a dry powder, as a slurry suspended in a suitable liquid, or as a solution in a liquid such as water, and they may be incorporated therein at any convenient point in the mud circulation system. In some cases, it is advantageous to first prepare a substantially dry concentrate by adding the deflocculating agent to the clay and, if desired, the other above-mentioned additives, prior to incorporating such in the aqueous vehicle to prepare the drilling fluid. In such cases the concentrate drilling mud can contain some water (usually below about 10% by weight of the mud solids) such as the normal moisture content of the air dried mud solids, generally very little water is desired since the aqueous vehicle is added later when the drilling fluid is prepared.

Aqueous dispersions of other types of finely divided solid materials in a deflocculated condition can be prepared using the ethane diphosphonates. Such slurry systems as water base paint pigment suspensions, cement slurries and coal slurries can also be improved by the addition of minor amounts of the deflocculating agent.

The invention will be further illustrated but is not limited by the following examples.

EXAMPLE I

In this example, deflocculating agents representative of the instant invention are tested along with the widely used polyphosphate deflocculants, i.e., sodium tripolyphosphate, tetrasodium pyrophosphate and sodium hexametaphosphate in a kaolin slurry. The kaolin which is used in the evaluation is essentially free of impurities and is mixed with distilled water to produce an aqueous slurry with a solids content of about 55%. The initial kaolin slurry has a pH of about 4. The final pH of the slurries after the deflocculating agents are added varies from about 7 to 8.4 except after adding the deflocculant sodium hexametaphosphate which slurry has a final pH of about 4.5. Viscosity measurements are made in a Stomer viscometer with hollow rotor and cup with side vanes only with apparent viscosity determined at 300 r.p.m. The results of the test are tabulated below:

TABLE 1

| Deflocculating agent | Deflocculating agent solids basis (percent) | Apparent viscosity (cp. at 300 r.p.m. on Stormer) |
|---|---|---|
| (1) Tetrasodium pyrophosphate | 0 | (1) |
|  | .1 | 80 |
|  | .15 | 50 |
|  | .2 | 40 |
|  | .3 | 40 |
|  | .4 | 40 |
| (2) Sodium tripolyphosphate | 0 | (1) |
|  | .1 | 110 |
|  | .15 | 50 |
|  | .2 | 40 |
|  | .3 | 40 |
|  | .4 | 40 |
| (3) Sodium hexametaphosphate | 0 | (1) |
|  | .1 | 90 |
|  | .15 | 50 |
|  | .2 | 40 |
|  | .3 | 40 |
|  | .4 | 40 |
| (4) Tetrasodium 1,2 dihydroxy ethane-1,1-diphosphonate. | 0 | (1) |
|  | .1 | 1050 |
|  | .15 | 60 |
|  | .2 | 50 |
|  | .3 | 50 |
|  | .4 | 50 |
| (5) Tetrasodium 2-amino-1-hydroxyethane-1,1-diphosphonate. | 0 | (1) |
|  | .1 | 910 |
|  | .15 | 200 |
|  | .2 | 70 |
|  | .3 | 40 |
|  | .4 | 40 |
| (6) Tetrasodium 2-methylamino-1-hydroxyethane-1,1-diphosphonate. | 0 | (1) |
|  | .1 | 670 |
|  | .15 | 140 |
|  | .2 | 40 |
|  | .3 | 40 |
|  | .4 | 40 |
| (7) Tetrasodium 2-diethylamino-1-hydroxyethane-1,1-diphosphonate. | 0 | (1) |
|  | .1 | 1,000 |
|  | .15 | 320 |
|  | .2 | 100 |
|  | .3 | 50 |
|  | .4 | 40 |
| (8) Tetrasodium 2-chloro-1-hydroxyethane-1,1-diphosphonate. | 0 | (1) |
|  | .1 | 720 |
|  | .15 | 100 |
|  | .2 | 60 |
|  | .3 | 40 |
|  | .4 | 40 |
| (9) Tetrasodium 2-cyano-1-hydroxyethane-1,1-diphosphonate. | 0 | (1) |
|  | .1 | 810 |
|  | .15 | 90 |
|  | .2 | 50 |
|  | .3 | 40 |
|  | .4 | 40 |
| (10) Tetrasodium 2-sulfo-1-hydroxyethane-1,1-diphosphonate. | 0 | (1) |
|  | .1 | 900 |
|  | .15 | 110 |
|  | .2 | 70 |
|  | .3 | 40 |
|  | .4 | 40 |
| (11) Tetrasodium 2-fluoro-1-hydroxyethane-1,1-diphosphonate. | 0 | (1) |
|  | .1 | 1,040 |
|  | .15 | 80 |
|  | .2 | 40 |
|  | .3 | 40 |
|  | .4 | 40 |
| (12) Diethyl(tetrasodium 2-hydroxy-2,2-diphosphonoethyl) malonate. | 0 | (1) |
|  | .1 | 1,100 |
|  | .15 | 180 |
|  | .2 | 60 |
|  | .3 | 40 |
|  | .4 | 40 |
| (13) Dibutyl (tetrasodium 2-hydroxy-2,2-diphosphonoethyl) malonate. | 0 | (1) |
|  | .1 | 960 |
|  | .15 | 150 |
|  | .2 | 60 |
|  | .3 | 40 |
|  | .4 | 40 |
| (14) Tetrasodium 2-methoxy-1-hydroxy ethane-1, 1-diphosphonate. | 0 | (1) |
|  | .1 | 1,050 |
|  | .15 | 310 |
|  | .2 | 100 |
|  | .3 | 40 |
|  | .4 | 40 |

TABLE 1—Continued

| Deflocculating agent | Deflocculating agent solids basis (percent) | Apparent viscosity (cp. at 300 r.p.m. on Stormer) |
|---|---|---|
| (15) Tetrasodium 2-ethoxy-1-hydroxy ethane-1, 1-diphosphonate. | 0 | (1) |
|  | .1 | 980 |
|  | .15 | 210 |
|  | .2 | 50 |
|  | .3 | 40 |
|  | .4 | 40 |
| (16) Tetrasodium 2-thiomethyl-1-hydroxy ethane-1, 1-diphosphonate. | 0 | (1) |
|  | .1 | 810 |
|  | .15 | 90 |
|  | .2 | 40 |
|  | .3 | 40 |
|  | .4 | 40 |
| (17) Tetrasodium 2-phenoxy-1-hydroxy ethane-1, 1-diphosphonate. | 0 | (1) |
|  | .1 | 1,000 |
|  | .15 | 150 |
|  | .2 | 60 |
|  | .3 | 50 |
|  | .4 | 40 |
| (18) Tetrasodium 2-thiophenyl-1-hydroxy ethane-1, 1-diphosphonate. | 0 | (1) |
|  | .1 | 1,150 |
|  | .15 | 170 |
|  | .2 | 80 |
|  | .3 | 40 |
|  | .4 | 40 |
| (19) Tetrasodium 2-oxyethane-1, 1-diphosphonate. | 0 | (1) |
|  | .1 | 960 |
|  | .15 | 120 |
|  | .2 | 60 |
|  | .3 | 40 |
|  | .4 | 40 |

1 Plastic.

The results of Table 1 shows that in each case the deflocculating agents represenative of the instant invention, i.e., (4) through (19) when added in very minor amounts of .1 to about .2 percent by weight on a solids basis effected a dramatic change in the viscosity of the slurry and when used in amounts greater than about .15% were equally as effective as the widely used polyphosphate deflocculating agents, i.e., (1), (2) and (3).

EXAMPLE II

Example I above is repeated with the exception that the tetrapotassium salts of the present invention deflocculating agents are used. The end viscosity results of this test are substantially the same as those set forth in Table 1.

EXAMPLE III

Example I above is repeated with the exception that the acid forms of the sodium salts of the ethane diphosphonates are used instead of the salts per se. In this case the pH of the individual kaolin slurries are all below pH 5. The viscosity data using the acids per se are similar to those data using the salts per se. At deflocculating agent (ethane diphosphonate) concentrations above about .1%, there is a substantial reduction in the viscosity.

EXAMPLE IV

Deflocculating agents representative of the instant invention, i.e. compounds heretofore designated Nos. 1, 2, 8, 9, 11, 14, 15, 16, 17, 21, 22, 25, 26 and 28, are tested along with the widely used polyphosphate deflocculants, i.e., sodium tripolyphosphate and tetrasodium pyrophosphate, in a kaolin slurry. The kaolin used in the evaluation is of a mine grade quality and is mixed with distilled water to produce an aqueous slurry with a solids content of about 70%. The slurry throughout the evaluation is maintained at a pH of about 7 with NaOH. Viscosity measurements were made with the Rotovisco rotational viscometer. The data are converted into apparent Newtonian viscosities (rate of shear of 249 sec.$^{-1}$).

The data show that the deflocculating agents as described above (compound Nos.) when added in very minor amounts, i.e., about .1%, effected a dramatic change in the viscosity of the slurry while the widely used polyphosphate deflocculants are substantially ineffective when used in the same amounts. In addition, it is found that deflocculating agents (i.e., the above compound numbers) are equally as effective as the polyphosphate deflocculants when use in amounts between about .2 and .35%.

As can be appreciated, therefore, ethane diphosphonates are extremely versatile deflocculating agents and it is intended that this invention cover their broad use in aqueous dispersions of finely divided solid materials and the resulting compositions therefrom. It is within the scope of the present invention that other deflocculating agents, such as those described in U.S. 3,346,487 and U.S. 3,346,488, both of which are incorporated herein by reference, can be used in combination with the present invention deflocculation agents where one so desires.

What is claimed is:

1. A slurry consisting essentially of an aqueous vehicle containing finely divided solid materials selected from the group consisting of coal and inorganic solid materials, selected from the group consisting of clays, bauxite, phosphate-containing ores, cements, pigments and mixtures thereof, and, as a deflocculating agent to disperse said solid materials into a finely divided dispersion, an ethane diphosphonate having the formula

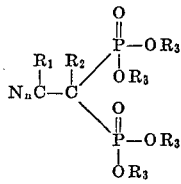

wherein (a) $R_1$ and $R_2$ are both hydroxy groups, (b) $R_3$ is selected from the group consisting of hydrogen, cations selected from the group consisting of alkali metal, alkaline earth metal, zinc, ammonium, alkyl ammonium obtained from amines having a molecular weight below 300 and mixtures thereof, and (c) $n$ is an integer having a value of is an integer having a value of 2.

2. The slurry as set forth in claim 1 wherein said ethane diphosphonate is 1,2-dihydroxy ethane-1,1-diphosphonic acid or its water soluble sodium salt.

3. A kaolin slurry consisting essentially of an aqueous suspension of kaolin and, as a deflocculating agent, an ethane diphosphonate having the formula

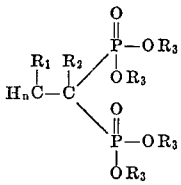

wherein (a) $R_1$ and $R_2$ are both hydroxy groups, (b) $R_3$ is selected from the group consisting of hydrogen, cations selected from the group consisting of alkali metal, alkaline earth metal, ammonium, alkyl ammonium obtained from amines having a molecular weight below 300, zinc and mixtures thereof, and (c) $n$ is an integer having a value of 2.

4. A drilling fluid consisting essentially of an aqueous suspension of clay and, as a deflocculating agent, an ethane diphosphonate having the formula

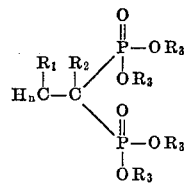

wherein (a) $R_1$ and $R_2$ are both hydroxy groups, (b) $R_3$ is selected from the group consisting of hydrogen, cations selected from the group consisting of alkali metal, alkaline earth metal, ammonium, alkyl ammonium obtained from amines having a molecular weight below 300 zinc and mixtures thereof, and (c) $n$ is an integer having a value of 2.

References Cited

UNITED STATES PATENTS

| | | |
|---|---|---|
| 3,299,123 | 1/1967 | Fitch et al. |
| 3,422,137 | 1/1969 | Quinby. |
| 3,451,939 | 6/1969 | Ralston. |
| 3,487,018 | 12/1969 | Troscinski. |
| 3,496,223 | 2/1970 | Irani et al. |
| 3,528,998 | 9/1970 | Tesoro. |
| 3,346,487 | 10/1967 | Irani et al. _____ 252—8.5 |
| 3,346,488 | 10/1967 | Lyons et al. _____ 252—8.5 |

HERBERT B. GUYNN, Primary Examiner

U.S. Cl. X.R.

44—51; 106—72, 90, 308 Q, 308 N; 252—331, 313 R, 351, 353, 356, 357; 260—456 R, 456.1, 485 R, 932, 502.4 P